US012319878B2

(12) United States Patent
Hommeltoft

(10) Patent No.: US 12,319,878 B2
(45) Date of Patent: Jun. 3, 2025

(54) UPGRADING OF LOW VALUE LIPID FEEDSTOCKS FOR REFINERY PROCESSING

(71) Applicant: CHEVRON U.S.A. INC., San Ramon, CA (US)

(72) Inventor: Sven Ivar Hommeltoft, Pleasant Hill, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 388 days.

(21) Appl. No.: 17/307,033

(22) Filed: May 4, 2021

(65) Prior Publication Data

US 2022/0041938 A1 Feb. 10, 2022

Related U.S. Application Data

(60) Provisional application No. 63/061,858, filed on Aug. 6, 2020.

(51) Int. Cl.
*C10G 3/00* (2006.01)
*C10G 67/02* (2006.01)

(52) U.S. Cl.
CPC .............. *C10G 3/48* (2013.01); *C10G 67/02* (2013.01); *C10G 2300/1003* (2013.01); *C10G 2300/1014* (2013.01); *C10G 2300/1018* (2013.01); *C10G 2300/301* (2013.01); *C10G 2300/4006* (2013.01); *C10G 2300/4012* (2013.01); *C10G 2300/4018* (2013.01)

(58) Field of Classification Search
CPC .. C10G 3/48; C10G 67/02; C10G 2300/1003; C10G 2300/1014; C10G 2300/1018; C10G 2300/301; C10G 2300/4006; C10G 2300/4012; C10G 2300/4018; Y02P 30/20
See application file for complete search history.

(56) References Cited

U.S. PATENT DOCUMENTS

| | | |
|---|---|---|
| 4,645,585 A | 2/1987 | White |
| 7,998,339 B2 | 8/2011 | Myllyoja et al. |
| 8,350,102 B2 | 1/2013 | Roberts, IV et al. |
| 8,354,065 B1 | 1/2013 | Sexton et al. |
| 9,580,657 B2 | 2/2017 | Heydenrych et al. |
| 9,903,584 B2 | 2/2018 | Fan et al. |
| 10,190,059 B2 | 1/2019 | Chapus et al. |
| 11,479,725 B2 | 10/2022 | Amblard et al. |
| 11,555,153 B1 | 1/2023 | Hommeltoft |
| 11,912,947 B1 | 2/2024 | Hommeltoft |
| 12,139,673 B2 | 11/2024 | Andersson et al. |
| 2009/0000185 A1 | 1/2009 | Aulich et al. |
| 2009/0158637 A1 | 1/2009 | McCall et al. |
| 2011/0054230 A1 | 3/2011 | Cole et al. |
| 2011/0056869 A1 | 3/2011 | Novak et al. |
| 2011/0237853 A1* | 9/2011 | Hamamatsu ............ C10G 45/02 585/638 |
| 2012/0137572 A1 | 6/2012 | Bartek et al. |
| 2012/0203042 A1 | 8/2012 | Huber et al. |
| 2012/0238787 A1 | 9/2012 | Gruber et al. |
| 2012/0244585 A1 | 9/2012 | Kale et al. |
| 2012/0316093 A1 | 12/2012 | Zhan et al. |
| 2013/0338409 A1 | 12/2013 | Trewalla et al. |
| 2014/0123973 A1 | 5/2014 | North |
| 2014/0163285 A1* | 6/2014 | Buchanan ............... B01J 23/02 585/469 |
| 2015/0087861 A1 | 3/2015 | Devaux et al. |
| 2015/0141703 A1 | 5/2015 | Dubois |
| 2018/0258349 A1 | 9/2018 | Heydenrych |
| 2019/0185759 A1 | 6/2019 | Kanervo et al. |
| 2021/0179952 A1 | 6/2021 | Tsuto et al. |
| 2022/0041938 A1 | 2/2022 | Hommeltoft |
| 2022/0049172 A1 | 2/2022 | Tiitta et al. |
| 2024/0157320 A1 | 5/2024 | Song et al. |
| 2024/0218261 A1 | 7/2024 | Hommeltoft |

FOREIGN PATENT DOCUMENTS

| | | |
|---|---|---|
| FI | 20205954 A1 | 3/2022 |
| FI | 20225933 A1 | 4/2024 |
| WO | 2008/152199 | 12/2008 |
| WO | 2009/130392 | 10/2009 |
| WO | 2014/089131 | 6/2014 |

(Continued)

OTHER PUBLICATIONS

M. Renz "Ketonization of Carboxylic Acids by Decarboxylation: Mechanism and Scope" Eur. J. Org. Chem. 2005, 979-988.
Mu et al., "Optimum design of radial flow moving-bed reactors based on a mathematical hydrodynamic model," Chemical Engineering and Processing 42 (2003), pp. 409-417.
Shirzad et al., "Moving Bed Reactors: Challenges and Progress of Experimental and Theoretical Studies in a Century of Research," Ind. Eng. Chem. Res. 58 (2019), pp. 9179-9198.
International Search Report & Written Opinion dated Oct. 28, 2024 for International Application No. PCT/US2024/038085, 14 pages.

(Continued)

*Primary Examiner* — Thuan D Dang
(74) *Attorney, Agent, or Firm* — Sheppard, Mullin, Richter & Hampton LLP; Jaime D. Choi

(57) ABSTRACT

A process is provided for upgrading low value lipid feedstocks for refinery processing. The process includes (a) treating a lipid feedstock comprising at least one fatty acid with a metal oxide catalyst on an oxide support under treating conditions to produce a treated stream, wherein the treating conditions include a temperature in a range of from 400° C. to 700° C.; a pressure in a range of from 0 to 10 MPa; and a liquid hourly space velocity in a range of from 0.1 to 10 h$^{-1}$; and (b) fractionating the treated stream to obtain a gaseous fraction and a liquid fraction comprising a bio-oil; wherein the bio-oil has a lower content of oxygen and impurities as compared to the lipid feedstock.

19 Claims, No Drawings

(56) References Cited

FOREIGN PATENT DOCUMENTS

WO    2015/148412    10/2015
WO    2023/066738    4/2023

OTHER PUBLICATIONS

Glowka et al., "Sustainable aviation fuel - Comprehensive study on highly selective isomerization route towards HEFA based bioadditives," Renewable Energy 220 (2024), 9 pages.
Huber et al., "Synthesis of Transportation Fuels from Biomass: Chemistry, Catalysts, and Engineering," Chem. Rev. (2006), 106, 4044-4098.

* cited by examiner

UPGRADING OF LOW VALUE LIPID FEEDSTOCKS FOR REFINERY PROCESSING

CROSS-REFERENCE TO RELATED APPLICATIONS

This application claims priority to and the benefit of U.S. Provisional Application Ser. No. 63/061,858, filed Aug. 6, 2020.

FIELD

This disclosure relates generally to the processing of compositions that may be used as renewable feedstocks for refinery processing.

BACKGROUND

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

Despite the ongoing research and development in the processing of renewable feedstocks and manufacture of fuels, there is still a need to provide an improved process for purifying renewable feedstock to provide purified feedstock, which is suitable for converting to valuable chemicals, such as hydrocarbons suitable as fuels or fuel blending components.

SUMMARY

In one aspect, there is provided a process which comprises (a) treating a lipid feedstock with a metal oxide catalyst on an oxide support under treating conditions to produce a treated stream, wherein the treating conditions include a temperature in a range of from 400° C. to 700° C.; a pressure in a range of from 0 to 10 MPa; and a liquid hourly space velocity in a range of from 0.1 to 10 $h^{-1}$; and (b) fractionating the treated stream to obtain a gaseous fraction and a liquid fraction comprising a bio-oil; wherein the bio-oil has a lower content of oxygen and impurities as compared to the lipid feedstock.

DETAILED DESCRIPTION

Definitions

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylglycerols), diglycerides (diacylglycerols), triglycerides (triacylglycerols, TAGs, or neutral fats); phosphoglycerides (glycerophospholipids); non-glycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing 3 to 39 carbon atoms, more particularly 7 to 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "pyrolysis" refers to the thermal decomposition of organic materials in an oxygen-lean atmosphere (i.e., significantly less oxygen than required for complete combustion).

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, but is not limited to, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" means parts-per-million and is a weight relative parameter. A part-per-million is a microgram per gram, such that a component that is present at 10 ppm is present at 10 micrograms of the specific component per 1 gram of the aggregate mixture.

Lipid Feedstock

The lipid feedstock originates from renewable or biological source or sources, and it is meant to include here feedstock other than those obtained from mineral oil, shale oil or coal.

The lipid feedstock may for example comprise 0 to 90 wt. % of free fatty acids, 5 to 100 wt. % fatty acid glycerol esters (e.g., mono-, di-, triglycerides) and 0 to 20 wt. % of one or more compounds selected from the list consisting of: fatty acid esters of the non-glycerol type, fatty amides, and fatty alcohols, where the renewable feedstock comprises more than 50 wt. % of free fatty acids and fatty acid glycerol esters such as 70 wt. % or more, for example 80 wt. % or more.

The lipid feedstock may originate for example from plants, animals, algae (algae oil, algae biomass, algae cultivation), fish and microbiological processes.

Examples of such feedstocks include feedstocks originating from low value renewable waste materials, side streams, by-products, refining waste and residues, sewage sludge, and any combinations thereof.

The lipid feedstock may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

Such lipid feedstocks typically contain varying amounts of impurities, such as phosphorus, silicon, chloride, alkali metals, earth alkaline metals, other metals, etc.

The lipid feedstock may comprise at least 10 ppm (e.g., 10 to 100 ppm, 10 to 75 ppm, 10 to 50 ppm, 15 to 100 ppm, or 15 to 50 ppm) of chlorine, calculated as elemental chlorine (a Cl atom). Chlorine content can be determined using combustion ion chromatography (CIC). Combustion ion chromatography is a technique in which a sample is burned in oxygen-containing gas flow, the gas generated is absorbed in an adsorption solution and then, a halogen ion adsorbed in the adsorption solution is quantitatively analyzed by an ion chromatography method. The technique makes it possible to easily analyze a halogen component in ppm range which has been conventionally difficult.

Lipid feedstocks comprising one or more of alkali metals, alkaline earth metals, and/or other metals, such as iron and manganese, even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof.

The lipid feedstock may comprise at least 1 ppm (e.g., 1 to 250 ppm, 1 to 100 ppm, 1 to 50 ppm, 1 to 25 ppm, 2 to 250 ppm, 2 to 100 ppm, or 2 to 25 ppm) of alkali metals, alkaline earth metals, metals of Groups VIIB and VIIIB, or combinations thereof, calculated as elemental metals, in total. Total metals content can be determined using AOCS Recommended Practice Ca 17-01.

Low value lipid feedstocks, such as various types of animal fats and waste oils, generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

The lipid feedstock may have an acid number of at least 5 mg KOH/g (e.g., 5 to 150 mg KOH/g, 10 to 150 mg KOH/g, from 10 to 100 mg KOH/g, from 10 to 50 mg KOH/g, from 10 to 25 mg KOH/g, or from 10 to 20 mg KOH/g). Acid number can be determined using ASTM D664.

The lipid feedstock may be pretreated. Such pretreatments include, but are not limited to, degumming, neutralization, bleaching, deodorizing, or any combination thereof.

Treatment of the Renewable Feedstock

In order to provide renewable feedstocks suitable for refinery operations, the lipid feedstock is treated with a metal oxide catalyst on an oxide support under treating conditions to produce a treated stream comprising a liquid fraction comprising a bio-oil which has a lower content of free fatty acids and impurities as compared to the renewable feedstock. The obtained bio-oil is particularly suitable as a renewable feedstock for hydroprocessing in biofuel manufacture.

Without being bound by theory, the treating is believed to proceed by a thermochemical process which includes one of more of cracking, decarboxylation, decarboxylation-coupling, dehydration and/or deoxygenation reactions.

Suitable treating conditions may comprise one or more of the following: a temperature in a range of from 400° C. to 700° C. (e.g., 425° C. to 650° C., or 450° C. to 600° C.); a pressure in a range of from 0 to 10 MPa (e.g., 0.1 to 5 MPa, or 0.1 to 1 MPa); and a liquid hourly space velocity (LHSV) in a range of from 0.1 to 10 h$^{-1}$ (e.g., 0.2 to 5 h$^{-1}$, or 0.3 to 3 h$^{-1}$).

The reaction may be carried out in the presence of a carrier gas such as hydrogen, nitrogen, carbon dioxide, $H_2O$ (water vapor) or C1-C4 hydrocarbons (e.g., methane, ethane, propane or mixtures thereof), preferably, $CO_2$ or $H_2O$. These gases may be admixed into the reaction mixture and/or may be formed in the course of the reaction. The carrier gas may be used to expel gaseous or volatile reaction products from the product mixture such as $H_2O$ or $CO_2$.

The reaction is carried out in the presence of a metal oxide catalyst on an oxide support. The metal of the metal oxide may be selected from Na, K, Mg, Ca, Sr, Cr, Mo, Mn, Fe, Co, Ni, Cu, Zn, Al, rare earth metals, or a mixture thereof. The oxide support may be selected from alumina, silica, silica-alumina, titania, zirconia, or a mixture thereof. In some aspects, the metal oxide catalyst comprises CaO, the oxide support being alumina.

The treating may be conducted in any suitable reactor or reactor configuration, such as a fixed bed reactor, a moving bed, a slurry reactor, a fluidized bed reactor, an ebullating bed reactor, a transport bed reactor, a two-phase bed reactor, a riser reactor, and a batch reactor. The feed stream can be flowed over the catalyst bed either up-flow or down-flow in the liquid, vapor, or mixed phase.

The process may be batch-type or semi-batch-type or continuous, suitably a continuous process is used.

The bio-oil has a lower content of oxygen and impurities as compared to the lipid feedstock.

The bio-oil may have a TAN of less than 5 mg KOH/g (e.g., less than 4 mg KOH/g, less than 3 mg KOH/g, less than 2 mg KOH/g, or less than 1 mg/KOH/g).

The bio-oil may comprise less than 10 ppm (e.g., less than 5 ppm, less than 1 ppm, or less than 0.5 ppm) of chlorine, calculated as elemental chlorine (a Cl atom).

The bio-oil may comprise less than 1 ppm of alkali metals, alkaline earth metals, metals of the Groups VIIB and VIIIB of the Periodic Table of Elements (other metals), or combinations thereof, calculated as elemental metals, in total, preferably less than 0.5 ppm.

The oxygen content of the bio-oil may be 5 wt. % or less (e.g., 3 wt. % or less, or 2 wt. % or less), on a dry basis, based on the total weight of the bio-oil. Oxygen content can be determined using ASTM D5291. Lipid feedstocks can have an oxygen content in a range of about 10 to 15 wt. %, on a dry basis, based on the total weight of the feedstock.

Hydroprocessing

Beneficially, the bio-oil produced by the process disclosed herein may be used directly as a refinery feedstock.

The obtained bio-oil may be blended with one or more mineral oil feedstocks originating from crude oil, shale oil or coal and likewise used as a refinery feedstock.

If desired, the bio-oil may be subjected to a catalytic hydroprocessing step. The obtained least one effluent (hydroprocessing product) may be fractionated in a fractionating step to provide hydrocarbon fractions, suitable as renewable fuels or fuel components, useful as transportation fuels, fuel components and other chemicals.

The catalytic hydroprocessing step may be carried out in one step or in more than one steps.

The catalytic hydroprocessing step may be carried out processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni, Pt and Pd. The catalyst(s) can also contain one or more support materials, for example zeolite, alumina, alumina-silica, zirconia, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from 100° C. to 450° C. (e.g., 200° C. to 370° C., or 230° C. to 350° C.); a pressure of from 0.5 to 30 MPa (e.g., 3 to 25 MPa, or 3 to 12 MPa); a liquid hourly space velocity of from 0.01 to 10 $h^{-1}$ (e.g., 0.1 to 5 $h^{-1}$). The hydrogen gas treat rate can be in a range of from 600 to 4000 $Nm^3/m^3$ (e.g., 1300 to 2200 $Nm^3/m^3$).

The hydroprocessing occurs in a reaction stage. The reaction stage can comprise one or more reactors or reaction zones each of which comprises one or more catalyst beds of the same or different catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., C1-C5 hydrocarbons), $H_2S$, CO and $CO_2$ are separated from the liquid component comprising >C5 hydrocarbons and some C1-C5 hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405. The person skilled in the art is able to vary the distilling conditions and to change the temperature cut point as desired to obtain any suitable hydrocarbon product, boiling suitably in the transportation fuel ranges.

EXAMPLES

The following illustrative examples are intended to be non-limiting.

Example

For the experimental work, a pretreated used cooking oil (UCO) was used as a feed. Though pretreated by conventional lipid pretreatment methods, the feed still contained impurities (see Table 1 below). In particular, the high chloride and residual metals content along with the high total acid number (TAN) of the pretreated UCO are indicative of the challenges that conventional lipid pretreatment have in removing these impurities to a level that makes lipid feedstocks processable in conventional crude oil refining processes.

The UCO was processed in a continuously operated fixed bed bench scale unit over 50 mL of calcium promoted alumina catalyst at atmospheric pressure and at a temperature of 900° F. or 950° F. In one run, the UCO was processed at a reaction temperature of 900° F. without the addition of water. In the second run, 22 g/h of water was co-fed with the UCO to the reactor operating at 950° F. The chemical and physical properties of the feed and liquid products are summarized in Table 1. Simulated distillation (SIMDIS) was determined according to ASTM D2887.

Chloride content is reported in ppm chlorine by weight of the composition and is determined by combustion ion chromatography. A known weight of sample is placed into a quartz sample boat and introduced into a high temperature combustion tube. The sample is combusted (1050° C.) in an oxygen-rich pyrohydrolytic environment and captures the combustion products in dilute hydrogen peroxide (absorbing solution). The resulting solution is analyzed by Ion Chromatography (IC). Chloride ion is separated from other anions after passing through the analytical column. The conductivity of the eluent is reduced with a suppressor prior to the conductivity detector, where the anion of interest ($Cl^-$) is measured. A set of chloride calibration standards containing known mass of chloride is used to quantify the chloride in the original combusted sample. Samples containing 1 to 100 ppm can be analyzed using this method. Combustion ion chromatography was carried out on a Metrohm Combustion IC to determine the chlorine content.

TABLE 1

Ketopyrolysis of UCO Over Calcium Promoted Alumina

|  | UCO Feed | Run 1 | Run 2 |
| --- | --- | --- | --- |
| Conditions |  |  |  |
| Temperature, ° F. | — | 900 | 950 |
| Pressure, atm | — | 1 | 1 |
| Flow, g/h | — | 38 | 39 |
| LHSV, $h^{-1}$ | — | 0.82 | 0.85 |
| Water flow, g/h | — | — | 22 |
| Properties |  |  |  |
| TAN, mg KOH/g | 20 | 0.95 | 1.03 |
| C, wt. % | 77.06 | 85.61 | 85.9 |
| H, wt. % | 11.3 | 12.44 | 12.21 |
| N, wt. % | <1 | <1 | <1 |
| O, wt. % | 11.64 | 1.95 | 1.89 |
| Cl, ppm | 16 | <1 | <1 |
| Na, ppm | 2.04 | <0.21 | <0.28 |
| Ca, ppm | 0.22 | <0.11 | <0.11 |
| Si, ppm | 0.72 | <0.21 | <0.21 |
| SIMDIS, ° F. |  |  |  |
| 0.5 wt. % | 644 | 83 | 298 |
| 5 wt. % | 686 | 178 | 302 |
| 10 wt. % | 778 | 230 | 308 |
| 30 wt. % | 1107 | 371 | 355 |
| 50 wt. % | 1123 | 483 | 436 |
| 70 wt. % | 1129 | 580 | 534 |
| 90 wt. % | 1143 | 749 | 673 |
| 95 wt. % | 1152 | 815 | 744 |
| 99.5 wt. % | 1226 | 981 | 920 |

As shown in Table 1, the liquid products from Runs 1-2 had significantly reduced TAN and chloride and residual metals content compared to the UCO feed.

Elemental analysis shows that the oxygen content in the liquid products from Runs 1-2 is lower than what a ketonization reaction alone would be expected to yield. Moreover, SIMDIS shows that >95% of the liquid products from Runs 1-2 are lower boiling than ketone dimers would be expected to have and at least 60% of the liquid products from Runs 1-2 are lighter than would be expected for a fatty acid unit alone. While not being bound by theory, it is believed that the observed liquid product distribution is not consistent with the composition undergoing a ketonization process exclusively and may be more consistent with a combined ketonization and pyrolysis process (i.e., a "ketopyrolysis" process).

The invention claimed is:

1. A process comprising:
   (a) using a combined ketonization and pyrolysis process to treat a lipid feedstock comprising at least one fatty acid glycerol ester over a metal oxide catalyst on an oxide support, under treating conditions, to produce a treated stream,
   wherein the lipid feedstock has at least 10 ppm of chlorine as an impurity, and
   wherein the treating conditions include:
      a temperature in a range of from 400° C. to 700° C.,
      a pressure in a range of from 0 to 10 MPa; and
      a liquid hourly space velocity selected to generate bio-oil comprising a plurality of oxygenated hydrocarbons including ketones, having less than 3 ppm chlorine as an impurity and a total acid number of less than 5 mg KOH/g;
   (b) fractionating the treated stream to obtain (i) a gaseous fraction and (ii) a liquid fraction comprising the bio-oil; and
   (c) using hydrodeoxygenation to convert the liquid fraction obtained in operation (b), including the bio-oil comprising the oxygenated hydrocarbons, into a renewable fuel.

2. The process of claim 1, wherein the lipid feedstock comprising at least one fatty acid glycerol ester is selected from the group consisting of soap-stocks, distillates from physical refining of plant oils or animal fats, distillers com oil (DCO) from ethanol production, waste cooking oils, lard, brown grease, yellow grease, trap grease, waste fats, low-grade oils, supercritical water liquefaction oils (SCWL oils), plant oils, animal fats, and any combination thereof.

3. The process of claim 1, wherein the metal oxide catalyst comprises a metal selected from the group consisting of Na, K, Mg, Ca, Sr, Cr, Mo, Mn, Fe, Co, Ni, Cu, Zn, Al, rare earth metals, and any combination thereof.

4. The process of claim 3, wherein the metal is selected from the group consisting of Na, K, Ca, Mg, and any combination thereof.

5. The process of claim 1, wherein the metal oxide catalyst comprises CaO.

6. The process of claim 1, wherein the oxide support is selected from the group consisting of alumina, silica, silica-alumina, titania, zirconia, and any combination thereof.

7. The process of claim 1, wherein the oxide support comprises alumina.

8. The process of claim 1, wherein the treating conditions include one or more of the following: a temperature in a range of from 450° C. to 600° C.; a pressure in a range of from 0.1 to 1 MPa; and a liquid hourly space velocity in a range of from 0.3 to 3 $h^{-1}$.

9. The process of claim 1, wherein the treating is carried out under flow of a carrier gas.

10. The process according to claim 9, wherein the carrier gas is nitrogen, carbon dioxide, a C1-C4 hydrocarbon, water, or a mixture thereof.

11. The process of claim 1, wherein the lipid feedstock further comprises one or more impurities selected from the group consisting of: phosphorus, silicon, alkali metals, alkaline earth metals, and other metals.

12. The process of claim 1, wherein the lipid feedstock further comprises
   at least 1 ppm of alkali metals, alkaline earth metals, metals of Groups VIIB and VIIIB, or combinations thereof, calculated as elemental metals, in total, as an impurity,
   and wherein the bio-oil comprises less than 1 ppm of alkali metals, alkaline earth metals, metals of Groups VIIB and VIIIB, or combinations thereof, calculated as elemental metals, in total, as an impurity.

13. The process of claim 1, wherein the bio-oil has an oxygen content of 5 wt. % or less, on a dry basis, based on a total weight of the bio-oil.

14. The process of claim 1, wherein the bio-oil has an oxygen content of 2 wt. % or less, on a dry basis, based on a total weight of the bio-oil.

15. The process of claim 1, wherein the lipid feedstock has an oxygen content of 10 to 15 wt. %, on a dry basis, based on a total weight of the lipid feedstock, as determined by ASTM D5291.

16. The process of claim 1, wherein the renewable fuel comprises hydrocarbons having a boiling point of at most 380° C., according to ISO EN 3405.

17. The process of claim 1, wherein the lipid feedstock comprises more than 50 wt. % of free fatty acids and fatty acid glycerol esters.

18. The process of claim 1, wherein the ketones comprise ketone dimers.

19. The process of claim 1, wherein the liquid hourly space velocity is in a range of from 0.1 to 10 $h^{-1}$.

* * * * *